United States Patent [19]

Marcus et al.

[11] Patent Number: 4,639,085

[45] Date of Patent: Jan. 27, 1987

[54] VISOR WITH MIRROR WITH FLEXIBLE SLIDING COVER

[75] Inventors: Konrad H. Marcus; Zooey C. Chu, both of Holland, Mich.

[73] Assignee: Prince Corporation, Holland, Mich.

[21] Appl. No.: 553,645

[22] Filed: Nov. 21, 1983

[51] Int. Cl.⁴ .......................... G02B 17/00; B60J 3/00
[52] U.S. Cl. .................... 350/283; 296/97 H
[58] Field of Search ............... 350/600, 279, 283, 601, 350/602, 276 R, 266, 642; 160/85, 86, 241; 362/141, 144; 296/97 H

[56] References Cited

U.S. PATENT DOCUMENTS

| 31,300 | 2/1861 | Cochrane . | |
|---|---|---|---|
| 146,414 | 1/1874 | Voorhees . | |
| 147,862 | 2/1874 | Reynolds . | |
| 331,901 | 12/1885 | McManes | 160/85 |
| 638,314 | 12/1899 | Blades . | |
| 888,862 | 5/1908 | Wilson . | |
| 1,008,748 | 11/1911 | Snavely | 160/297 |
| 1,951,213 | 5/1932 | Schlumbohm | 350/642 |
| 2,545,400 | 3/1951 | White . | |
| 2,594,867 | 4/1952 | Carmona | 160/86 |
| 2,803,297 | 8/1957 | Wenke . | |
| 3,375,364 | 3/1968 | Marcusi | 362/144 |
| 3,542,455 | 11/1970 | Jensen | 350/283 |
| 3,603,672 | 9/1971 | Bastide | 350/283 X |
| 3,910,688 | 10/1975 | Yamashita | 350/279 |
| 4,213,169 | 6/1980 | Kempkers | 362/141 X |
| 4,486,819 | 12/1984 | Marcus, II et al. | 296/97 H |
| 4,500,169 | 2/1985 | Donnelly | 350/600 |

FOREIGN PATENT DOCUMENTS

| 0053663 | 6/1982 | European Pat. Off. | 296/97 H |
|---|---|---|---|
| 2429685 | 1/1980 | France | 296/97 H |
| 0063517 | 4/1983 | Japan | 296/97 H |

*Primary Examiner*—John K. Corbin
*Assistant Examiner*—David Lewis
*Attorney, Agent, or Firm*—Price, Heneveld, Cooper, DeWitt & Litton

[57] ABSTRACT

A vehicle visor includes a frame member having a mirror mounted thereto and a flexible cover for the mirror. A guide and support structure is mounted to the frame for guidably supporting the flexible cover to permit movement of the cover between a position covering the mirror and a position exposing the mirror for use.

8 Claims, 11 Drawing Figures

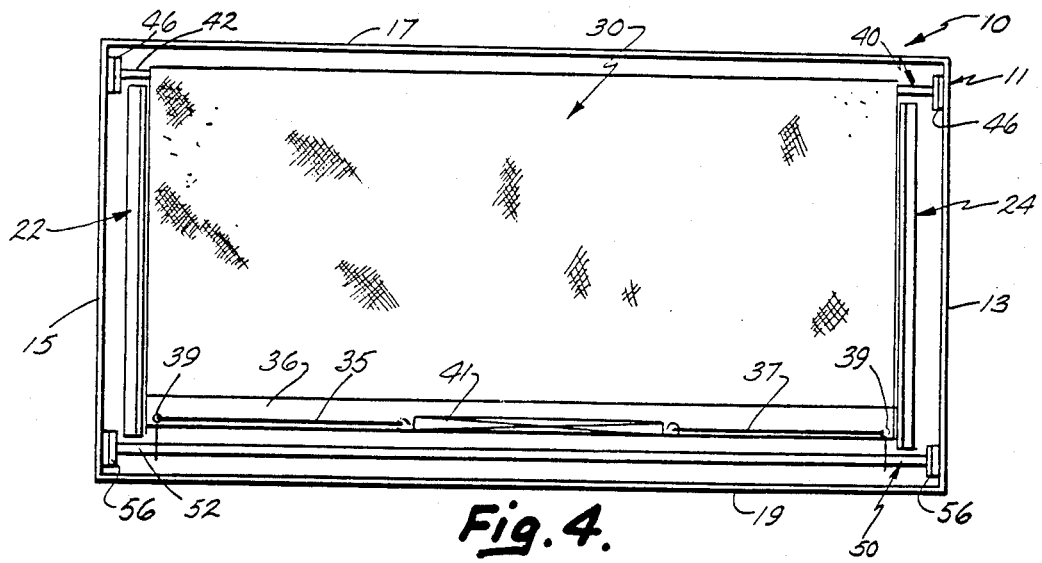
Fig. 4.
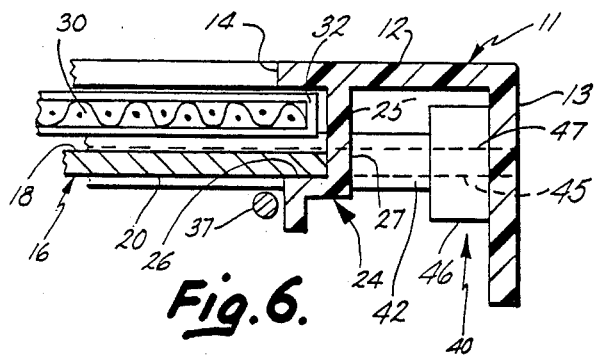
Fig. 6.
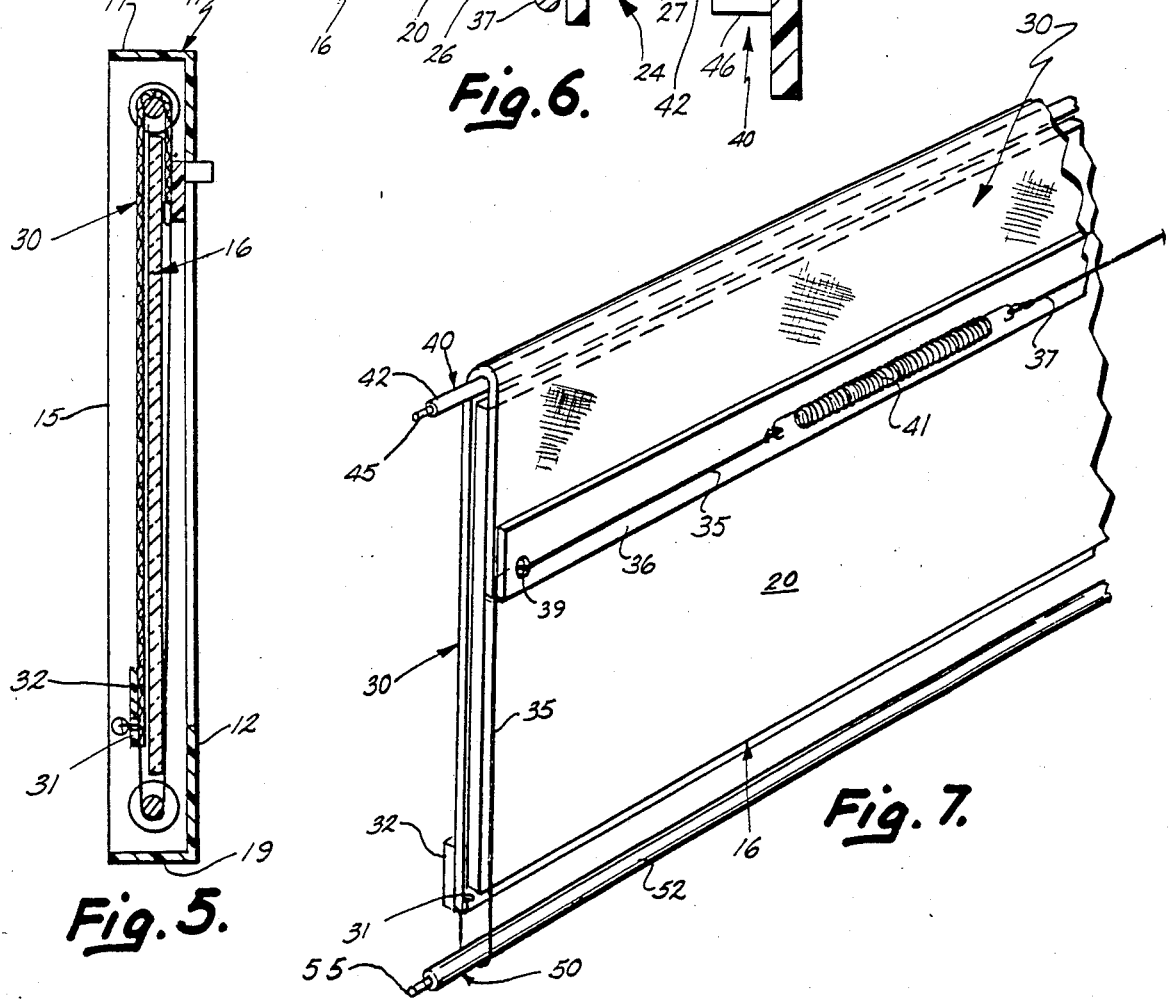
Fig. 5.
Fig. 7.

VISOR WITH MIRROR WITH FLEXIBLE SLIDING COVER

BACKGROUND OF THE INVENTION

The present invention pertains to a mirror which is selectively covered by a flexible cover material and particularly to such structure mounted in an automotive visor.

Vanity mirrors for use in vehicles and particularly mounted in the visors of vehicles have become standard equipment on many cars and popular options on others. Preferably, the mirror is covered when not in use to provide a protective cover for safety as well as covering the reflective surface which can be distracting to the driver of the vehicle. U.S. Pat. No. 4,227,242 discloses an illuminated vanity mirror with a cover which pivots from the plane of the visor to selectively expose the mirror for use and provide a protective cover for the mirror when not in use. French Pat. No. 2,429,685, published Jan. 25, 1980, discloses a visor having a mirror mounted therein which includes one or more sliding doors for providing a protective covering for the mirror. With the sliding cover disclosed in the above noted French patent, the size of the mirror is greatly diminished since the rigid door must be stored in the same plane as the mirror and occupies a significant area of the visor.

SUMMARY OF THE PRESENT INVENTION

The present invention provides a unique, flexible cover for use in covering a mirror which occupies significantly less space than the structures of the prior art and provides an attractive and protective mirror cover particularly adapted for use with a vanity mirror mounted in a visor.

Apparatus embodying the present invention include a frame member including a mirror mounted thereto and a flexible cover for the mirror together with guide means mounted to the frame for guidably supporting the flexible cover to permit movement of the cover between a position covering the mirror and a position exposing the mirror for use. In a preferred embodiment of the invention, the frame is mounted within the body of a visor for use in a vehicle. In some embodiments of the invention, the flexible cover can be fabric or of tambour door construction. The guide means, in the preferred embodiment of the invention, comprises roller means over which the flexible cover material extends and means connecting opposite ends of the cover together and to the roller means to assure positive travel of the cover between open and closed positions.

These and other features, advantages and objects of the present invention will become apparent upon reading the following description thereof together with reference to the accompanying drawings in which:

BRIEF DESCRIPTION OF THE DRAWINGS

FIG. 4 is a rear elevational view of the structure shown in FIG. 3;

FIG. 5 is an enlarged, cross-sectional view of the structure shown in FIG. 3 taken along section line V—V of FIG. 3;

FIG. 6 is a greatly enlarged, fragmentary, cross-sectional view of the structure shown in FIG. 2 taken along section VI—VI of FIG. 2;

FIG. 7 is a fragmentary, enlarged, perspective view of a portion of the guide and support means for the flexible cover employed in the embodiment shown in FIGS. 1 through 6;

DETAILED DESCRIPTION OF THE PREFERRED EMBODIMENT

Figure 1:
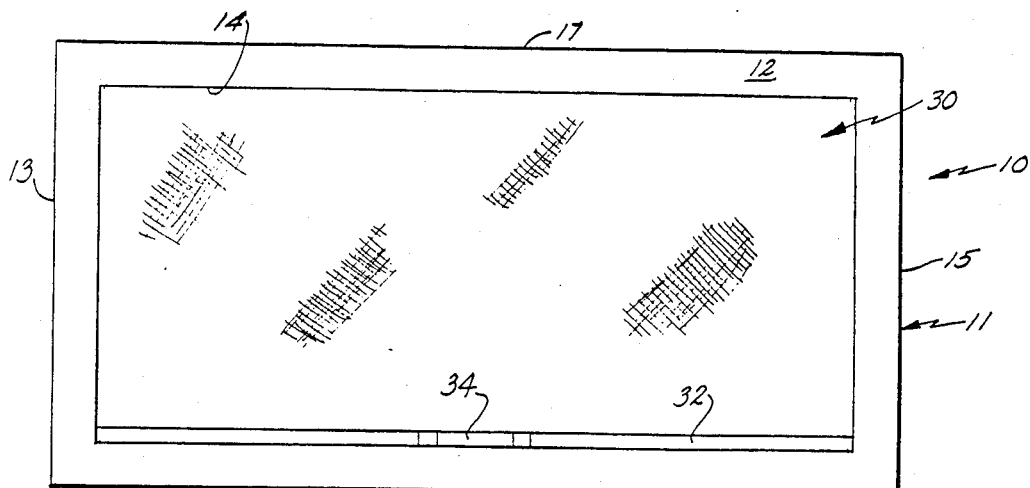
FIG. 1 is a front elevational view of a mirror panel having a flexible cover shown in the closed position.
Figure 2:
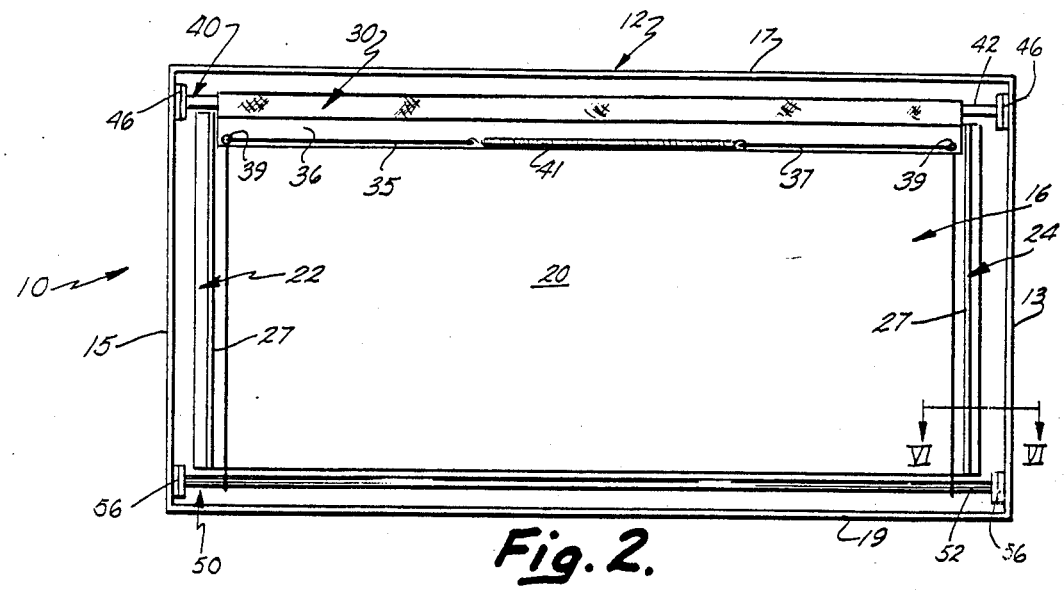
FIG. 2 is a rear elevational view of the structure shown in FIG. 1.
Figure 3:
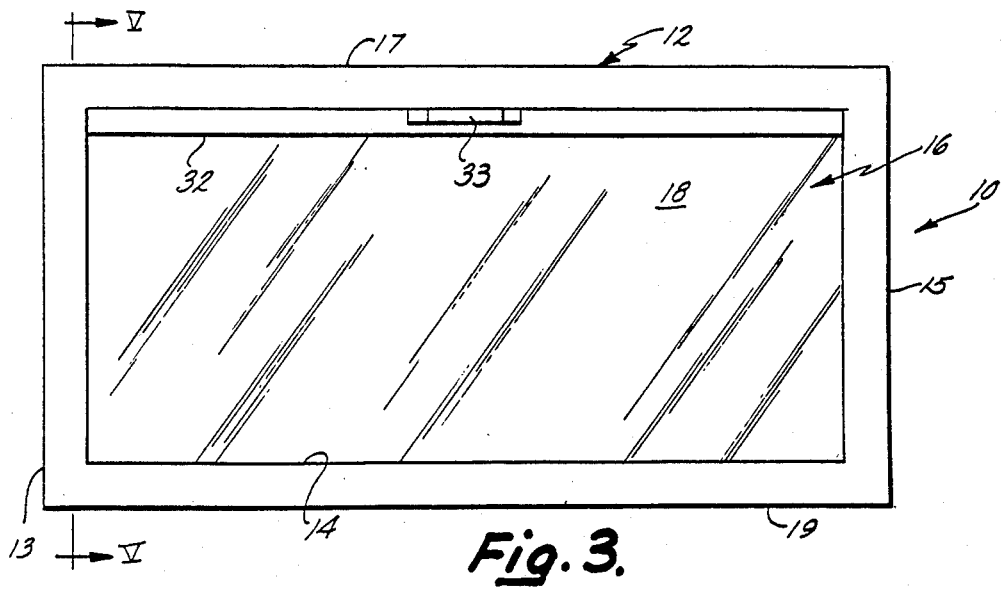
FIG. 3 is a front elevational view of the structure shown in FIG. 1 showing the cover in the open position exposing the mirror therebehind.

Referring initially to FIGS. 1 and 3 which disclose my mirror panel in closed and open position, respectively, a covered mirror panel 10 is shown which includes a generally rectangular frame 11 having a face portion 12 through which there is formed a large rectangular opening 14 for a mirror 16. The frame further includes left and right sidewalls 13 and 15 (FIGS. 3 and 4) extending rearwardly from the face 12 and integrally joined upper and lower rearwardly extending walls 17 and 19 to define a housing for holding a mirror 16 therein behind opening 14. Mirror 16 includes a reflective surface 18 (FIG. 3) and a rear surface 20 (FIG. 2). As disclosed in detail by FIG. 6, the mirror 16 is secured to the frame 11 behind opening 14 by a pair of generally vertically extending guide channels 22 and 24 secured to the inside of the face 12 of the frame. Each of the guide channels 22 and 24 are configured to provide a plurality of guiding and supporting functions. As best seen in FIG. 6, guide channel 24 includes a vertically and rearwardly extending wall portion 25 which extends from the rear surface of face 12 of frame 11 spaced slightly outwardly of the aperture 14. Segment 25 extends rearwardly a sufficient distance to provide clearance for the cover 30 and mirror 16. Channel 24 then extends inwardly toward opening 14 to define a ledge 26 against which the rear surface 20 of mirror 16 is seated and secured by, for example, a suitable bonding material such as an adhesive. Each of the guide channels 22 and 24 also include a stub section 27 extending rearwardly from the ledge 26. The guide channels 22 and 24 extend vertically in parallel spaced relationship to each other substantially the same distance as the height of mirror 16 which naturally is slightly larger than the opening 14 to fill the opening when exposed.

The mirror is selectively covered and uncovered by a flexible cover 30 which can be made of fabric such as a woven or knitted fabric typically used as the interior trim material of an automobile to thus match the cover appearance with that of the interior of the vehicle. The flexible cover 30 can likewise be made of flexible sheets of thin polymeric material such as polyvinylchloride or the like or be of tambour construction with rigid wooden or plastic horizontal slats secured to a flexible fabric base. The lower edge of the fabric 30 is secured to a lower cover support 32 which comprises a flat, generally rectangular bar of rigid material such as polycarbonate to which the lower edge of fabric cover 30 is secured by bonding adhesive or other conventional fastening means. The front center area of cover support 32 includes an outwardly extending handle 34 to facilitate movement of the cover between a closed position, as shown in FIG. 1, to an open position, as shown in FIG. 3. Support 32 extends, as best seen in FIG. 6, adjacent the walls 25 of each of the guide channels 22 and 24 and is captively held in lateral alignment between the mirror 16 and the face 12 of the frame 11 by the guide channels which provide sufficient clearance for relatively easy motion of the support in a vertical direction between channels 22 and 24. The flexible cover 30 is generally rectangular and has a length (i.e., dimension in the generally vertical direction as seen in the Figures) slightly greater than the height of the mirror so as to cover the entire height of the mirror with sufficient material to extend over an upper roller assembly 40 and downwardly behind the mirror 16 terminating in a second cover support 36, as seen in FIGS. 2, 4, 5 and 7. Support 36 extends between the stubs 27 of each of the guide channels 22 and 24, as seen in FIGS. 2 and 4, to be guidably supported thereby. Support 36, like support 32, is a generally flat, rigid, rectangular member made of a suitable polymeric material and to which the upper edge of the flexible cover 30 is secured by suitable fastening means such as by bonding adhesives, by ultrasonic welding or the like. In order to transmit forces between support 32 and support 34 to move the flexible cover between the closed position, shown in FIG. 1, and the open position, as shown in FIG. 3, the roller and line structure, as best seen in FIGS. 2, 4, 5, 6 and 7, is employed and is now described.

Extending between the sidewalls 13 and 15 of frame 11 are a pair of upper and lower roller assemblies 40 and 50, respectively (FIGS. 2 and 4). The roller assemblies comprise the rods 45 and 55, respectively (FIG. 7). As illustrated by FIG. 6 (only in respect to one of the roller assemblies 40) the rod 45 extends into mounting bosses 46 positioned in the inside corners of the sidewalls of the frame It should be understood that although not specifically illustrated, rod assembly 50 is identical to assembly 40 so that rod 55 (FIG. 7) extends into boss 56 (FIGS. 2 and 4). Apertures, such as illustrated in FIG. 6 by aperture 47, are formed through the mounting bosses and sidewalls 13 and 15 to receive the rods which are secured in position with respect to the frame. Coaxially surrounding the rods 45 are an upper sleeve 42 and a lower sleeve 52 (FIG. 7) made of a suitable material such as a polymeric material and which loosely fits over each of the rods 45 and 55 so as to rotate therearound. This permits the flexible cover 30 to extend around sleeve 42 and thereby easily move around the rod 45 through the relative rotation between sleeve 42 and rod 45. The opposite corners of cover support 32 include apertures 31 formed in there for receiving ends of line segments 35 and 37 which, as best seen in FIGS. 5 and 7, extend downwardly from support 32, around sleeve 52 then upwardly and through apertures 39 in opposite ends of support 36 and are joined to one another by tensioning means such as a tension spring 41.

The operation of the sliding, flexible cover can best be understood by reference first to FIGS. 1 and 7 in which the mirror is covered by the flexible cover 30. If it is desired to uncover the mirror, handle 34 attached to support 32 is raised, which transmits tension force on strings 35 and 37 which in turn pull downwardly on support 36 to pull the cover 30 upwardly and over pivot rod 45 by the rotation of sleeve 42 therearound until the cover has been fully opened, as illustrated in FIG. 5. Spring 41 simply maintains the tension on lines 35 and 37 substantially constant and in some embodiments may not be necessary.

To close the cover once in an open position, as illustrated in FIG. 3, tension on the fabric is applied directly through support 32 by pushing the handle 34 downwardly which in turn allows support 36 to follow the fabric in an upward direction back to the cover closed position, as illustrated in FIGS. 2 and 7. Thus, by use of the unique guide and support means, the otherwise flexible cover can be moved upwardly and downwardly using a single control handle 34 to urge the cover between a position in front of the reflective surface of the mirror mounted to the frame over and behind the surface of the mirror for exposing the mirror for use. The structure provides a very compact and relatively thin construction which is suitable for a variety of applications including use in an automotive visor, as shown in FIG. 8.

Figure 8:
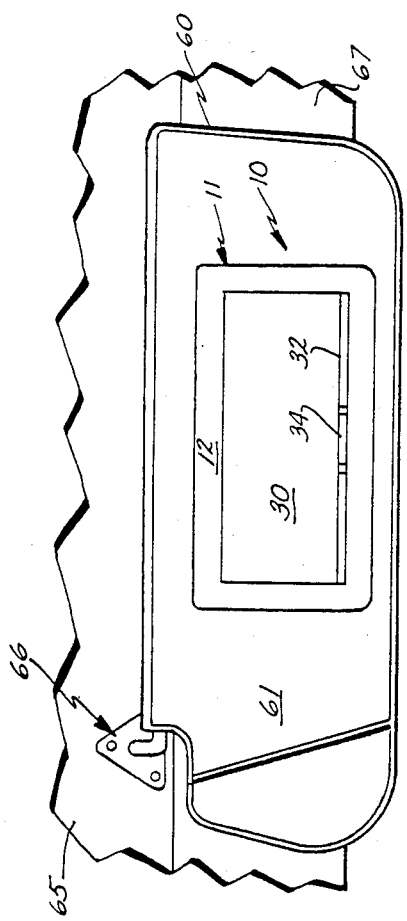
FIG. 8 is a front elevational view of a visor embodying the present invention.

In FIG. 8, the covered mirror panel 10 is fitted within the body of a visor 60 having a molded polymeric core including a recess for receiving the frame 11 of the assembly in a recessed fashion such that the face 12 of frame 11 is substantially flush with the surface of the body of visor 60. The visor body can be manufactured of a molded polymeric material such as polypropylene of a configuration generally the same as that disclosed in U.S. Pat. No. 4,227,241 with provision made for securing the frame 11 in place within the visor body by conventional attaching means. The flexible cover 30 can be a fabric which conforms to a fabric covering 61 associated with the visor body. The upholstery of the visor in turn is coordinated to the material of the interior of the vehicle 65 to which the visor is attached by means of a pivot arm assembly 66 which can be of a construction shown in U.S. patent application, Ser. No. 392,534, entitled VISOR CONTROL, filed on June 28, 1982 now U.S. Pat. No. 4,500,131. Thus, when the visor is in a lowered use position as illustrated in FIG. 8, for blocking light entering from the windshield area 67 of the vehicle, the mirror faces the vehicle occupant and can be exposed for use as a vanity mirror by raising handle 34 to selectively uncover the mirror moving it to the position illustrated in FIG. 3.

Figure 9:
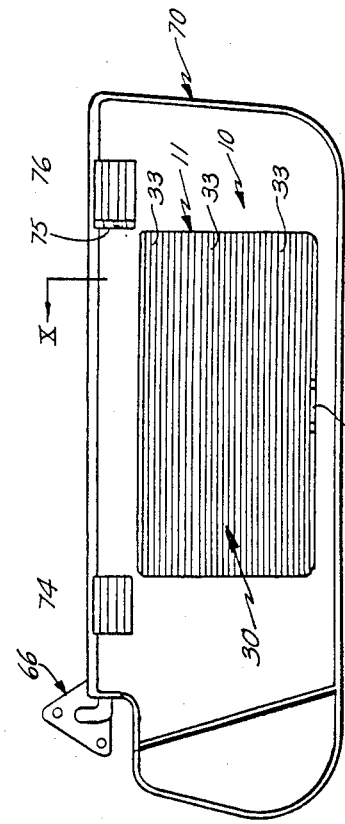
FIG. 9 is a front elevational view of an alternative embodiment of the present invention shown mounted in a lighted visor.
Figure 10:
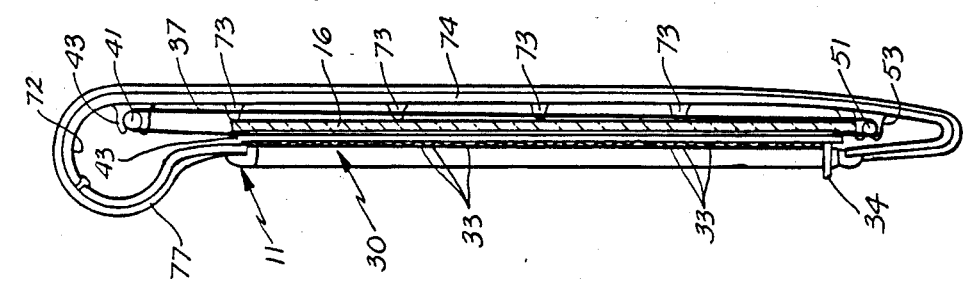
FIG. 10 is an enlarged, cross-sectional view of the structure shown in FIG. 9 taken along section line X—X of FIG. 9.

Another embodiment of the invention is illustrated in FIGS. 9 and 10, and in which a visor 70 includes a covered mirror panel 10 of the present invention. In this embodiment, the flexible cover 30 is of tambour door construction including a handle 34 at its lower edge for raising and lowering the door between a mirror covering position, as illustrated in FIG. 9, to an open position, as illustrated in FIG. 3 The tambour door 30 comprises a plurality of horizontally extending rigid slats 33, as seen in FIGS. 9 and 10, which are secured to a flexible backing material 43. The slats can be wood, plastic or other suitable material.

The visor 70 includes a molded polymeric body including a generally semi-cylindrical housing 72 at its upper end, as seen in FIG. 10, for receiving, as seen in FIG. 9, a pair of spaced lamp assemblies 74 and 76 each including lamp means positioned behind lenses mounted to a visor and activated by a switch 75 coupling the lamps to the vehicle's electrical supply system for projecting illumination outwardly from the assembly 74 and 76 to illuminate the area in front of mirror 16 positioned behind cover 30. In this embodiment of the invention, the upper and lower roller assemblies 40 and 50 comprise rod 41 rotatably mounted to a pair of semi-cylindrical resilient polymeric sockets 43 integrally molded in horizontally spaced relationship at the upper portion of the visor body and a pair of horizontally spaced lower semi-cylindrical resilient polymeric sockets 53 at the lower edge for rotatably receiving rod 51.

As in the embodiment shown in FIGS. 1 through 7, the covered mirror panel 10 mounted within visor 70 includes tension strings 35 and 37 coupled to opposite edges of the tambour door 30 to assist in the opening and closing of the door by wrapping around the upper pivot rod 41. The mirror 16 is mounted on a plurality of mounting pads 73 which space the mirror from the back surface 74 of the visor sufficiently to allow the tambour door to fit behind the mirror and within the relatively thin visor body. The visor 70 is covered by a suitable upholstery fabric 77 to conform to the upholstery fabric of the vehicle interior in which the visor is mounted. Visor 70 also includes a pivot mounting bracket 66 for securing the visor to a vehicle and when in the lowered use position, illustrated in FIG. 9, the lights 74 and 76 can be illuminated by activation of switch 75 to provide interior illumination of the vehicle as well as for providing facial illumination for use of the vanity mirror when cover 30 is raised using handle 34. Since the slats 33 forming the tambour construction have some rigidity, stringing 35 and 37 can be attached directly to the tambour door without the utilization of cover supports.

Figure 11:
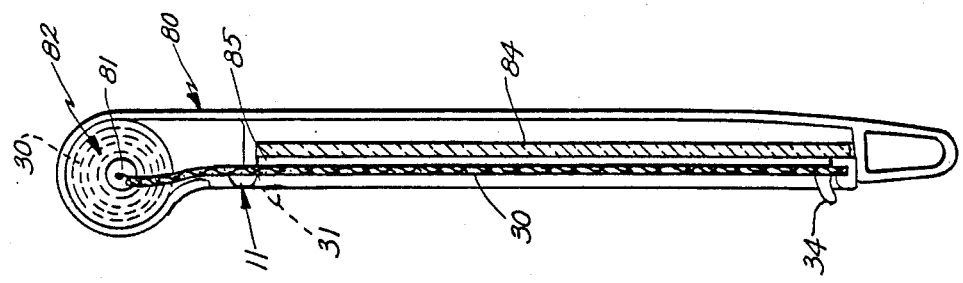
FIG. 11 is a vertical, cross-sectional view of yet another embodiment of the present invention.

In yet another embodiment of the invention, a visor 80 is provided, as illustrated in FIG. 11, in which the visor body includes a generally cylindrical housing 82 extending along a top edge of the body of the visor which also supports a mirror 84 selectively covered by a flexible covering material 30 with a handle 34 along its lower edge for raising and lowering the cover. The cover is attached to the axle 81 of a spring actuated roller such as a small window shade-type roller extending within housing 82 and around which the cover 30 can be wound, as illustrated in phantom form in FIG. 11, when the cover is moved to an open position. To open the cover, it is necessary only to press handle 34 slightly thereby releasing the catch controlling the spring wound roller 81 whereupon it will rotate in a clockwise direction as illustrated in FIG. 11 to roll the flexible cover 30 therearound and store it within housing 82. Handle 34 contacts the upper edge of frame 11 to prevent the cover from fully retreating into the housing 82. Housing 82 communicates with the area in front of mirror 84 by means of a slot 85 extending along the top edge of mirror 84 to provide clearance therefor. Guide channels similar to channels 22 and 24 shown in the first embodiment are employed to provide guided support for the edges of cover 30. In some embodiments, the roller can be coupled directly to bias means such as a coil spring and tend to wind the cover around the roller, and the handle 34 includes a releasable catch cooperating with frame 11 to hold the cover in a closed position.

It will become apparent to those skilled in the art that various modifications to the preferred embodiments disclosed herein can be made by those skilled in the art without departing from the spirit or scope of the invention as defined by the appended claims.

The embodiments of the invention in which an exclusive property or privilege is claimed are defined as follows:

1. In a visor having a covered mirror comprising:
    a visor body defining a housing having a frame;
    a mirror stationarily mounted to said visor body in said frame, said frame including an opening in which said mirror is mounted, said opening exposing said mirror;
    said housing including an aperture extending adjacent and along at least one edge of said opening and mirror;
    a flexible cover for said mirror, said cover being of a size and shape to cover said opening;
    roller means mounted within said housing, adjacent opposite edges of said opening and behind said frame; and
    rigid means secured to opposite edges of said flexible cover substantially parallel to said opposite edges of said opening; said rigid means being coupled to each other by strings to form a continuous loop extending around said roller means for permitting movement of said cover around said roller means and through said aperture between a first position covering said opening and covering said mirror and between a second position extending into said housing behind said mirror so as to expose said mirror through said opening.

2. The apparatus as defined in claim 1 wherein said rigid means secured to opposite edges of said flexible cover comprises bars of rigid material one for each of said opposite edges of said flexible cover, each of said bars coupled to one of said opposite edges of said flexible cover, and said strings secured to and extending between said bars and coupling said bars together to complete said continuous loop.

3. The apparatus as defined in claim 1 wherein said roller means includes rod means positioned within said housing for supporting said cover which passes around said rod means when within said housing.

4. The apparatus as defined in claim 3 wherein said rod means comprises a pair of spaced rods extending between sides of said frame and at the top and bottom edges of said frame and wherein said line means extends over said spaced rods.

5. The apparatus as defined in claim 4 wherein said rod means includes a fixed rod and a concentric roller sleeve.

6. The apparatus as defined in claim 5 wherein said flexible cover is made of a fabric material.

7. The apparatus as defined in claim 1 wherein said housing is enlarged and extends along a top edge of said visor body and said roller means is positioned in said enlarged portion of said housing and comprises a biased roller to which one edge of said flexible cover is attached for winding said cover onto said roller for storage within said housing.

8. The apparatus as defined in claim 7 wherein said means for moving said flexible cover comprises handle means coupled to an edge of said flexible cover remote from said roller.

* * * * *